United States Patent [19]

Nakamura

[11] Patent Number: 5,179,629
[45] Date of Patent: Jan. 12, 1993

[54] DEVICE FOR COMPUTING MEMBERSHIP FUNCTIONS IN FUZZY COMPUTERS

[75] Inventor: Kazuo Nakamura, Itami, Japan

[73] Assignee: Mitsubishi Denki Kabushiki Kaisha, Tokyo, Japan

[21] Appl. No.: 599,328

[22] Filed: Oct. 17, 1990

[30] Foreign Application Priority Data

Oct. 20, 1989 [JP] Japan .................. 1-274348

[51] Int. Cl.$^5$ ............................. G06G 7/12
[52] U.S. Cl. ...................... 395/3; 395/900; 395/61
[58] Field of Search ............ 364/513, 807; 395/3, 395/900

[56] References Cited

U.S. PATENT DOCUMENTS 4,837,725  6/1989  Yamakawa .................. 364/807
4,875,184  10/1989 Yamakawa .................. 364/807

OTHER PUBLICATIONS

Togai et al., "Expert System on a Chip=An Engine for Real Time Approximate Reasoning", IEEE Expert, Fall 1986, pp. 55-62.

Zadeh, L. A., "Fuzzy Logic", Computer, Apr. 1988, pp. 83-93.

*Primary Examiner*—Michael R. Fleming
*Assistant Examiner*—Robert W. Downs
*Attorney, Agent, or Firm*—Townsend and Townsend

[57] ABSTRACT

A fuzzy computer which is provided with a control part for generating control information to define a trapezoidal membrship function, an operating unit for calculating the both oblique sides of the trapezoid by operating input data according to the control information, a comparator (overflow detection circuit) for comparing operation results of the operating unit with a predetermined value which is based on the control information, and a data elector for selecting, according to the comparison results of the comparator, either of the operation results of the operating unit or the predetermined value in order to obtain the both bases of the trapezoid, that is, both of the maximum and minimum values of the membership function, in order to generate the membership function, as a result, the fuzzy computer entails neither a large-storage memory nor complicated software operations which need processing time.

24 Claims, 9 Drawing Sheets

Fig. 3
Prior Art

| LINE | | | |
|---|---|---|---|
| 0 | | | x IS IN cx, f(x) IS TO BE INPUTTED TO ax |
| 1 | | mov dx,32 | ;PREPARE 32 AT dx |
| 2 | | mov ax,0 | ;MAKE f(x)=0 |
| 3 | | cmp cx,dx | ;IF x<32 |
| 4 | | jb fncend | ; MAKE f(x)=0 AND FINISH |
| 5 | | cmp cx,96 | ;IF x<96 |
| 6 | | jb fncclc | ; CALCULATE A |
| 7 | | mov dx,192 | ;PREPARE 192 AT dx |
| 8 | | cmp cx,dx | ;IF x>192 |
| 9 | | ja fncend | ; MAKE f(x)=0 AND FINISH |
| 10 | | mov ax,255 | ;MAKE f(x)=255 |
| 11 | | cmp cx,128 | ;IF x≤128 |
| 12 | | jbe fncend | ; MAKE f(x)=255 AND FINISH |
| 13 | fncclc: | sub dx,cx | ;SUBTRACT x FROM 32 OR 192 |
| 14 | | jns fncskp | ;IF RESULT IS NEGATIVE |
| 15 | | neg dx | ; INVERT |
| 16 | fncskp: | add dx,dx | ;FOUR TIME SUBTRACTED RESULT |
| 17 | | add dx,dx | ; |
| 18 | | mov ax,ax | ;MOVE RESULT |
| 19 | fncend: | | ;NEXT INSTRUCTION |

Fig. 7

| VALUE OF x (AREA) | OPERATION UNIT 2 | | OPERATION UNIT 3 | | OUTPUT VALUE |
|---|---|---|---|---|---|
| | d0 | d1 | d0 | d1 | y |
| p | 1 | 0 | 0 | 1 | "0" |
| q | 0 | 0 | 0 | 1 | STRAIGHT LINE A |
| r | 0 | 1 | 0 | 1 | "255" |
| s | 0 | 1 | 0 | 0 | STRAIGHT LINE B |
| t | 0 | 1 | 0 | 1 | "0" |

DEVICE FOR COMPUTING MEMBERSHIP FUNCTIONS IN FUZZY COMPUTERS

BACKGROUND OF THE INVENTION

1. Field of the Invention

The present invention relates to a fuzzy computer, and more in particular, to a fuzzy computer which is capable of computing a membership function necessary for fuzzy operation at higher speed with less hardware.

2. Description of Related Art

When fuzzy operation is executed, it is necessary to compute a function f(x), which is called a membership function, for an input x so that the input x can be converted into the data capable of being fuzzily operated as described in Toshio Terano et al., "A Guide to Fuzzy System" (Ohm Book Company, Inc., 1987), pp. 150 through 152.

The membership function f(x) is in general of a bell-shape, triangle, or trapezoid, and it is customary to adopt the membership function of either the triangle or trapezoid so that the fuzzy operation could readily be carried out.

In digital operation, the membership function f(x) is defined with integer values $f_0, f_1, f_2 \ldots f_{n-1}, f_n$ which are corresponding to discrete values x (x=0, 1, 2 ... n−1, n). Accordingly, conventionally when the membership function f(x) is obtained by a computer, it is necessary that the integer values should be stored on a memory in advance as shown in FIG. 1, and then the value of the function f(x) should be read by making the input x as an index, or the value of the function f(x) should directly be computed by software.

Where such a membership function as shown in FIG. 2 is computed by, for example, a microprocessor 8088 manufactured by Intel Co., it is necessary to execute a program such as shown in FIG. 3.

Now will be described bellow the program shown in FIG. 3.

This program designates the process that a value of the function f(x) is obtained from the input x being stored in a cx register and then is stored in an ax register.

In the first and seventh lines, there are instructions to prepare their respective constants in a dx register.

There are instructions to set a value of the function f(x) to "0" in advance in the second line and to set a value of the function f(x) to "255" in advance in the tenth line, respectively.

And first it is checked in the third line whether the input x is within the area of p shown in FIG. 2 or not, and when the input x is within the area of p, the function f(x) is made to be as f(x)="0" in the fourth line, finishing the program.

Then, it is checked in the fifth line whether the input x is within the area of q shown in FIG. 2, or not, and when the input x is within the area of q, the program is branched in the sixth line to the thirteenth line in order to compute a straight line A.

Next, it is checked in the eighth line whether the input x is within the area of t shown in FIG. 2 or not, and when the input x is within the area of t, the function f(x) is made to be as f(x)="0" in the ninth line, finishing the program.

And it is checked in the eleventh line whether the input x is within the area of r shown in FIG. 2 or not, and when the input x is within the area of r, the function f(x) is made to be as f(x)="255" in the twelfth line, finishing the program.

As can be seen from the above description, processings in the thirteenth line through eighteenth line are to be carried out when the input x is within the area of q in FIG. 2 (where the value of dx register is "32") or the area of s (where the value of dx register is "192").

In those processings, the program is finished after the straight line A or B was computed. The thirteenth line designates an instruction to subtract the input x from the value of the dx register. And when the results of this instruction show that the subtracted value is negative, the input x is within the area of q, and then, the value is inverted to be positive in the fourteenth line and fifteenth line.

The sixteenth line and seventeenth line designate instructions to quadruplicate the subtraction results, and the eighteenth line designates an instruction to move the subtraction results in the ax register.

The conventional fuzzy computer has generated the membership function according to the above process steps, and then, when there is adopted the method of reading the membership function from the memory according to the index value, there exists inconvenience that it is necessary to equip a mass-storage memory for storing the membership function, and when there is adopted the method of calculating the membership function by using softwares, there exists inconvenience that it takes longer time to compute the membership function.

SUMMARY OF THE INVENTION

The foregoing inconvenience are overcome in accordance with the present invention, and the present invention is directed to provide a fuzzy computer which is capable of computing a membership function at higher speed by fewer hardwares.

The fuzzy computer in accordance with the present invention is provided with a control portion for generating control information to define the membership function, an operating unit for operating input data in accordance with the control information, a comparator for comparing operation results of the operating unit with a predetermined value which is based on the control information, and a data selector for selecting, according to the comparison results of the comparator, either the operation results of the operation means or the predetermined value which is based on the control information.

With the fuzzy computer in accordance with the present invention, the control portion generates the control information, accordingly, the operating unit operates input data, and the comparator compares the operation results with the predetermined value which was set in advance based on the control information, following which the data selector, according to the comparison results, selects either the operation results or the predetermined value which is set in advance based on the control information, thereby, obtaining the value of the membership function.

The above and further objects and features of the invention will more fully be apparent from the following detailed description with accompanying drawings.

BRIEF DESCRIPTION OF THE DRAWINGS

FIG. 3 is a schematic diagram to illustrate by way of example a program to generate the membership function by the conventional microprocessor using a software;

FIG. 7 is a table to illustrate the relationship between an internal signal and an output signal for input data of the fuzzy computer of the present invention;

DESCRIPTION OF THE PREFERRED EMBODIMENTS

Now will be described below an embodiment of the present invention in detail with reference to the attached drawings.

Figure 4:
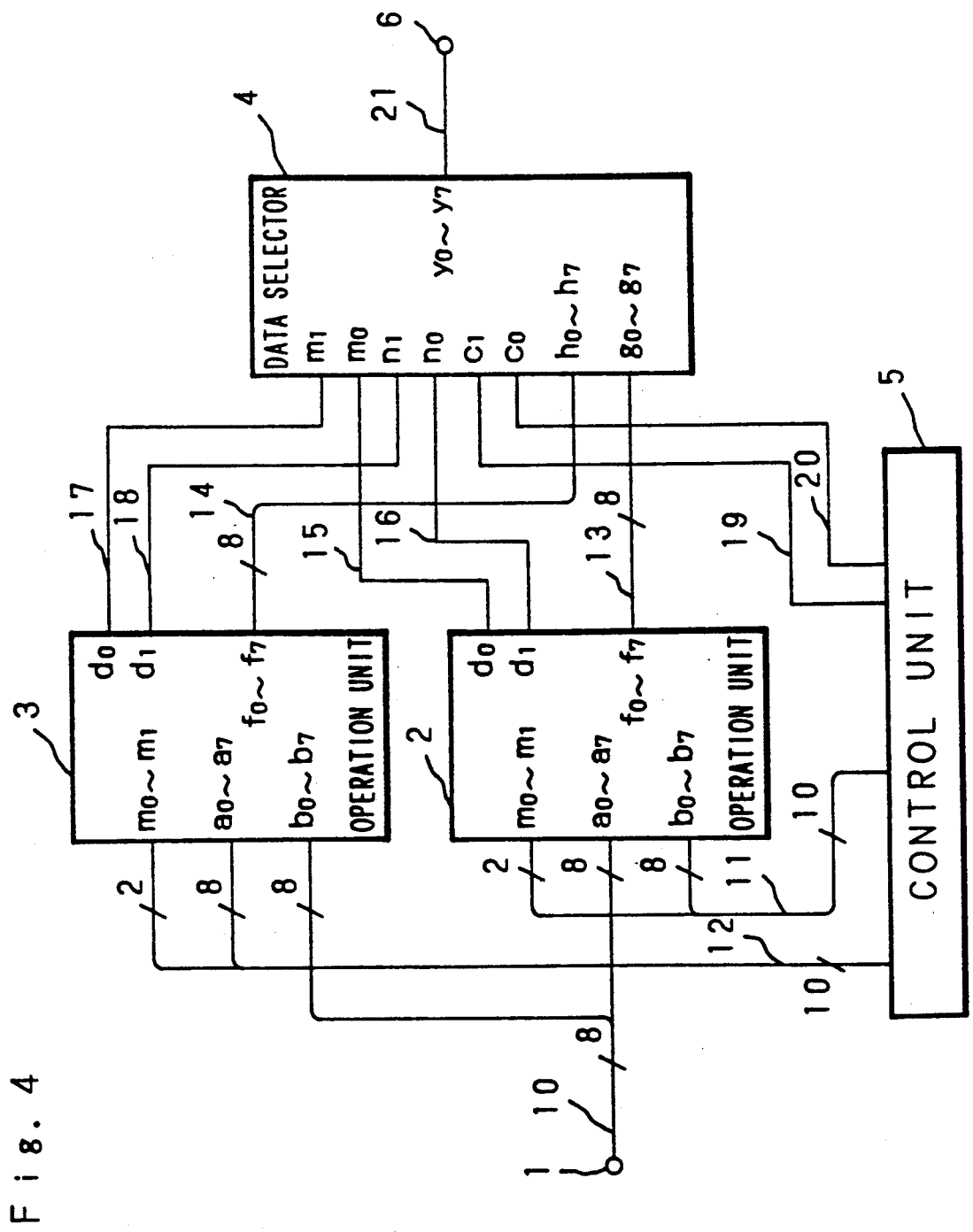
FIG. 4 is a block diagram to illustrate a construction of a portion for generating a membership function of the fuzzy computer of the present invention.

FIG. 4 is a schematic diagram to illustrate a construction of a portion for generating a membership function of the fuzzy computer of the present invention.

In FIG. 4, reference numeral 1 designates an input terminal for inputting an input x.

Reference numerals 2 and 3 designate operating units, each of which operates an input data 10 (input x) of 8 bits which are inputted from the input terminal 1 according to $b_0$ through $b_7$ and $a_0$ through $a_7$ of control signals 11 and 12 (both made of 10 bits) which are generated in a control part 5 in such a way as will be described later. Control part 5 may be a register or other memory device. These operation results $f_0$ through $f_7$ are to be outputted as the outputs designated by reference numerals 13 and 14 (both made of 8 bits).

The operating unit 2 checks the operation results 13 whether to be less than "−1" or not as well as more than "256" or not, outputting both of the respective comparison results $d_0$ and $d_1$ as the outputs designated by reference numerals 15 and 16 (both made of 1 bit).

As in the same way as the operating unit 2, the operating unit 3 checks the operation results 14 whether to be less than "−1" or not as well as more than "256" or not, outputting both of the respective comparison results $d_0$ and $d_1$ as the outputs designated by reference numerals 17 and 18 (both made of 1 bit).

Reference numeral 4 designates a data selector, which inputs each of the comparison results 15, 16, 17 and 18 of the above both operating units 2 and 3 and control signals 19 and 20 (both made of 1 bit) being outputted from the control part 5 as $m_0$, $n_0$, $m_1$, $n_1$, $c_0$ and $c_1$ and selects, according to these values, one from the operation results 13 and 14 of the operating units 2 and 3 and constants "0" and "255", outputting this as an output value 21 ($y_0$ through $y_7$) of 8 bits to an output terminal 6.

Figure 5:
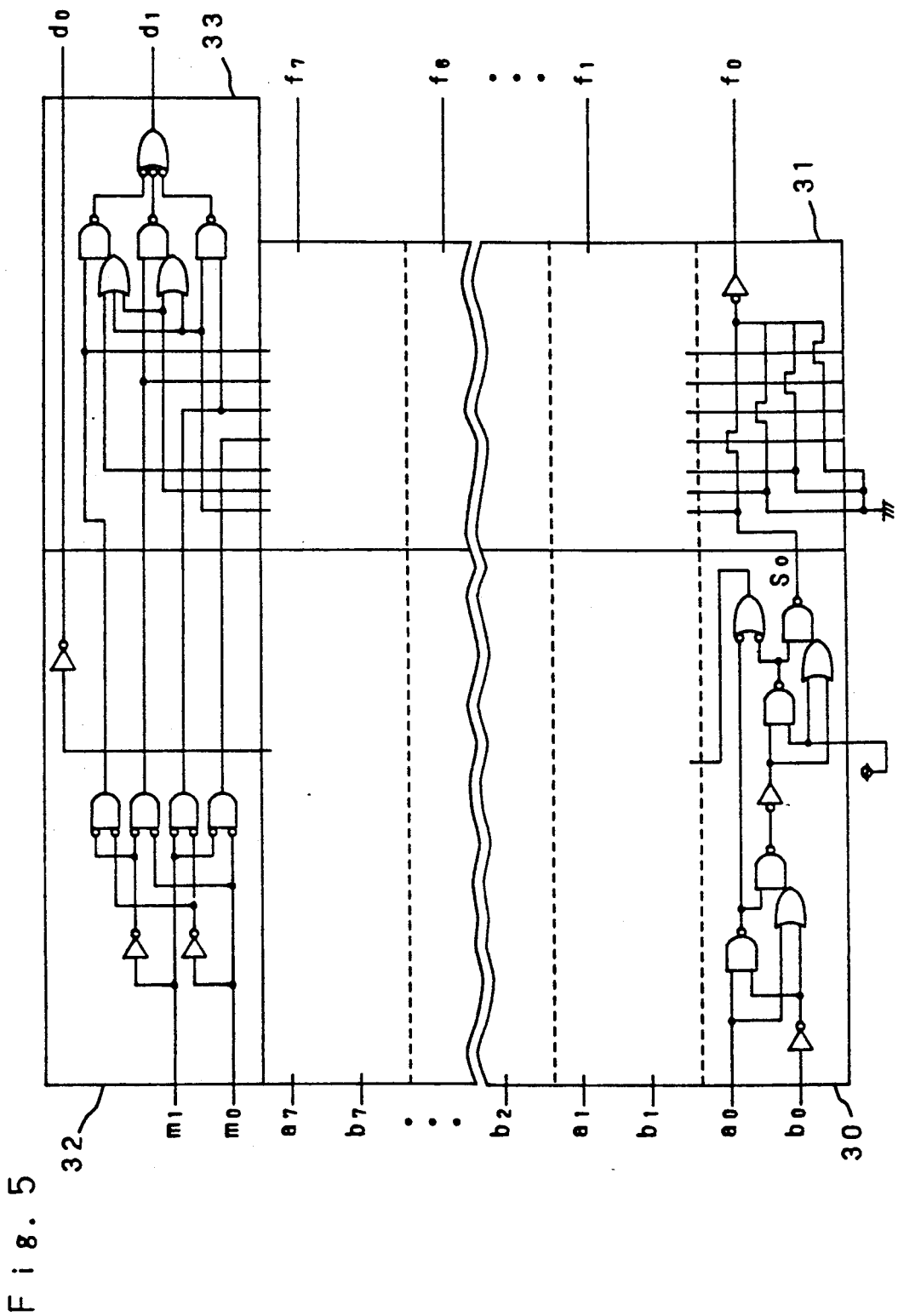
FIG. 5 is a circuit diagram to illustrate a construction of two operating units of the fuzzy computer of the present invention.

FIG. 5 is a circuit diagram to illustrate construction of the operating units 2 and 3, both of which are the same construction.

In FIG. 5, reference numeral 30 designates a subtracter, which subtracts the input data $b_0$ through $b_7$ of 8 bits from the input data $a_0$ through $a_7$ of 8 bits, outputting this as subtraction results $s_0$ through $s_7$.

Incidentally, in the operating unit 2, the input data $a_0$ through $a_7$ of 8 bits is the input x and the input data $b_0$ through $b_7$ of 8 bits is the 8 bits in the control signal 10 outputted from the control part 5. And in the operating unit 3, the input data $a_0$ through $a_7$ of 8 bits is the 8 bits of the control signal 10 outputted from the control part 5 and the input data $b_0$ through $b_7$ of 8 bits is the input x.

Reference numeral 31 designates a shifter, which shifts the subtraction results $s_0$ through $s_7$ of the subtracter 30 to the left side by 0, 1, 2 or 3 bits and outputs them as $f_0$ through $f_7$ when the values to be shown by the input $m_0$ and $m_1$ of two bits are within the values "0" through "2".

The input $m_0$ and $m_1$ are, in the operating unit 2, other two bits excepting $b_0$ through $b_7$ of the control signal 10 outputted from the control part 5, and is, in the operating unit 3, other two bits excepting $a_0$ through $a_7$ of the control signal 11 outputted from the control part 5.

One bit of each of the subtracter 30 and shifter 31 is shown in the figure, however, 8 bits of the same constructed circuit of each of them are practically being in cascade connection.

Reference numeral 32 designates a decoder for the shifter 31 which decodes the input $m_0$ and $m_1$ of two bits and sends this to the shifter 31.

Reference numeral 33 designates an overflow detection circuit for the shifter 31 which checks whether the operation results of the operating units 2 and 3 are more than "256" or not, outputting these results 16 and 18 as a signal $d_1$.

An output signal $d_0$ of the overflow detection circuit 33, which is a borrow signal of the subtracter 30, is outputted as a signal to indicate the comparison results 15 and 17 of whether the operation result is "−1" and downward or not.

Summing up the above description, assuming that the input data $a_0$ through $a_7$ is a, the $b_0$ through $b_7$ is b, the output $f_0$ through $f_7$ is f, and the input $m_0$ and $m_1$ is m, the operating units 2 and 3 shown in FIG. 5 execute such an operation as:

$$(a-b)\times 2^m$$

and output the operation results as the f as well as compares the operation results with "−1" and with "255", outputting the comparison results as $d_0$ and $d_1$, respectively.

Figure 6:
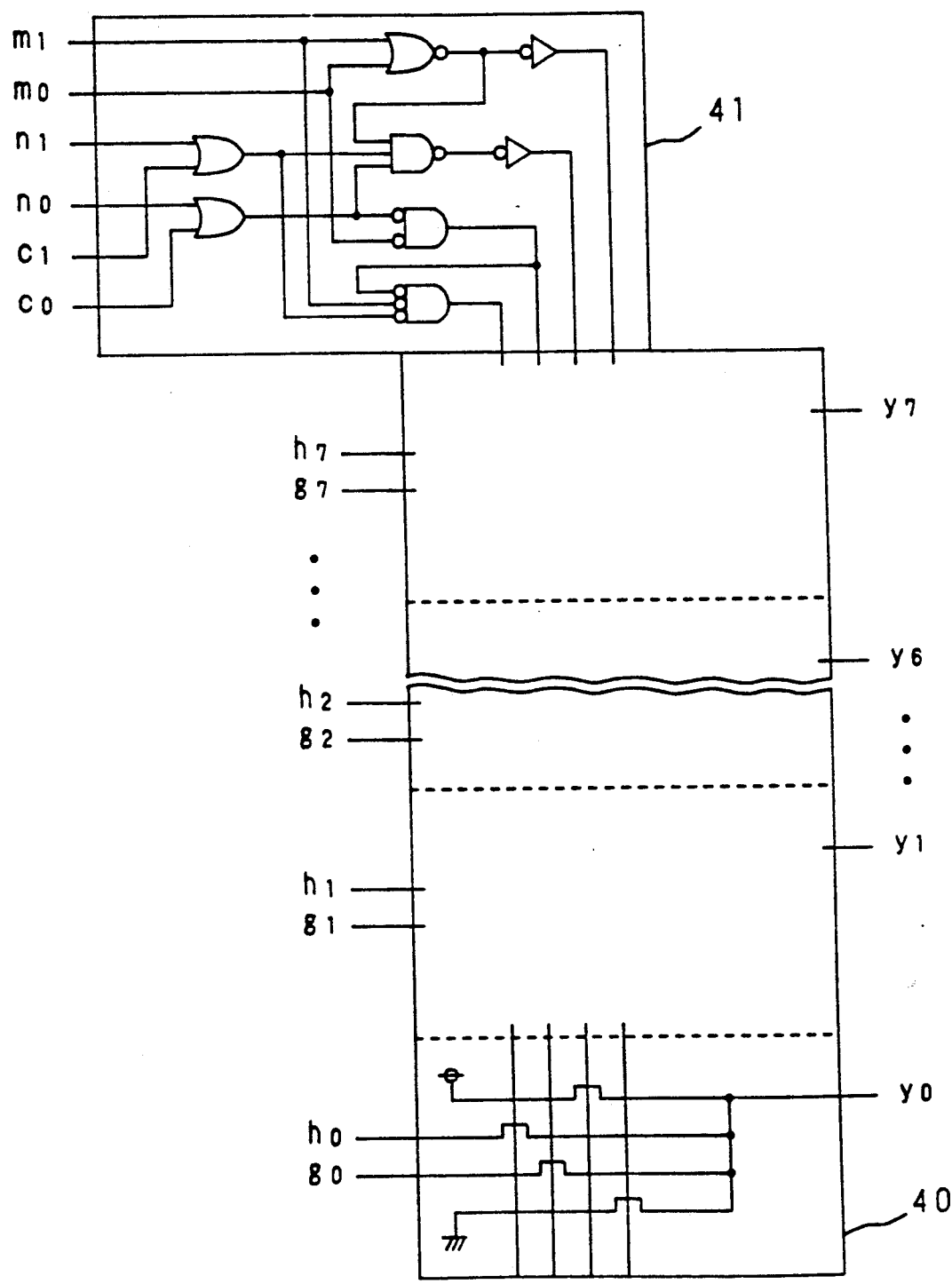
FIG. 6 is a circuit diagram to illustrate a constriction of a data selector of the fuzzy computer of the present invention.

Now will be referred to the data selector 4. FIG. 6 is a circuit diagram to illustrate a construction of the data selector 4.

In FIG. 6, reference numeral 41 designates a decoder, which decodes the input $m_0$, $m_1$, $n_0$ and $n_1$ of four bits and generates a control signal of a selector 40. In the decoder 41, control signals 19 and 20 (see FIG. 4) to be inputted to the input $c_0$ and $c_1$ are both made to be "0".

Reference numeral 40 designates a selector, which selects, according to the decoded results of the decoder 41, one from $g_0$ through $g_7$ which are the output $f_0$ through $f_7$ being the operation results 13 of the operating unit 2, $h_0$ through $h_7$ which are the output $f_0$ through f$_7$ being the operation results 14 of the operating unit 3, or the constant "0" or "255", and outputs y$_0$ through y$_7$. This output y$_0$ through y$_7$ is outputted to the output terminal 6 as the output value 21 of the data selector 4.

Meanwhile, only one bit of each of the selector 40 and decoder 41 is shown in FIG. 6, however, 8 bits of the same constructed circuit of each of them are practically being in cascade connection.

Now will be described below operation of the fuzzy computer of the present invention thus constructed.

Figure 1:
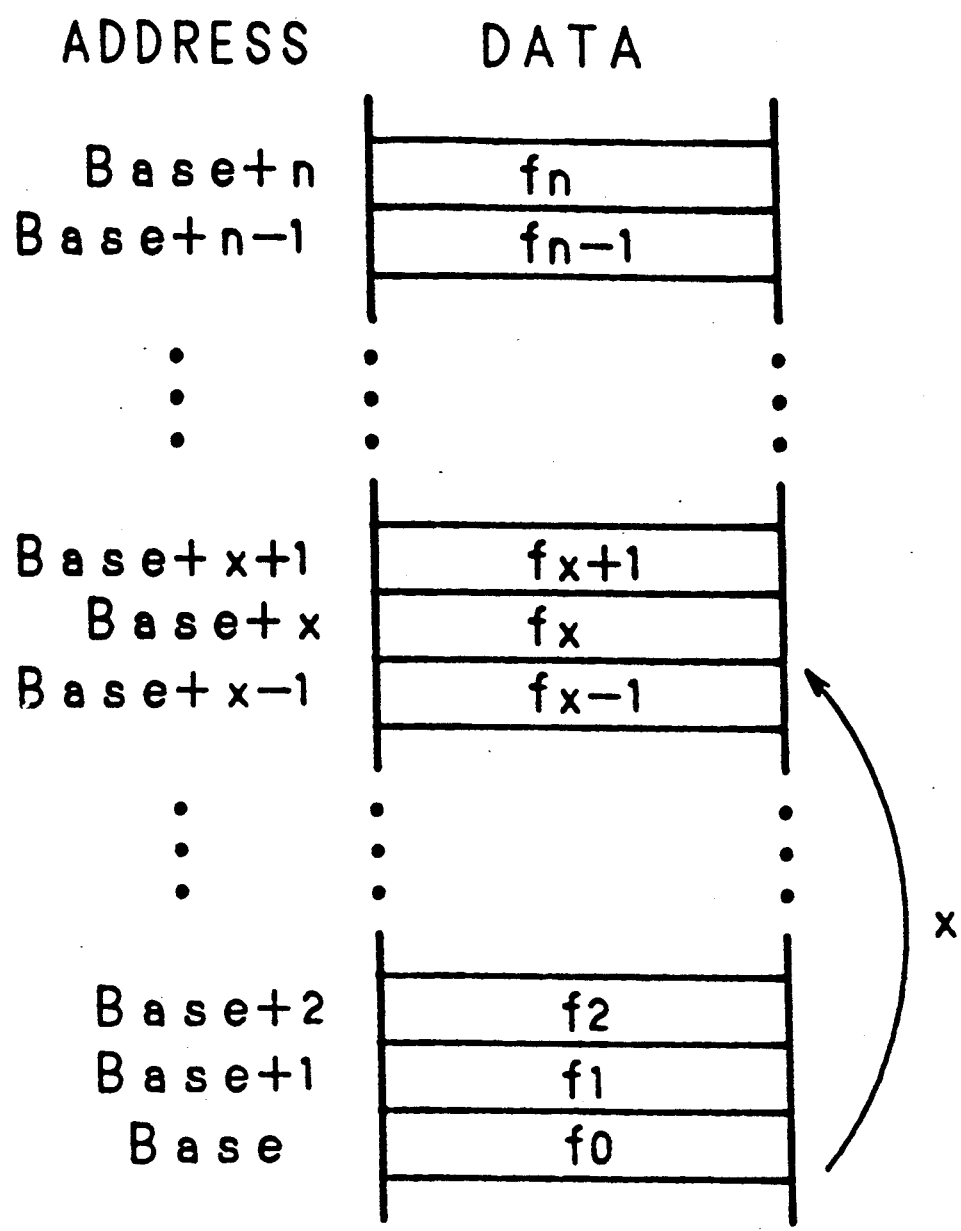
FIG. 1 is a schematic diagram to illustrate a content of a memory area of a conventional fuzzy computer in which a membership function is stored on a memory in advance.
Figure 2:
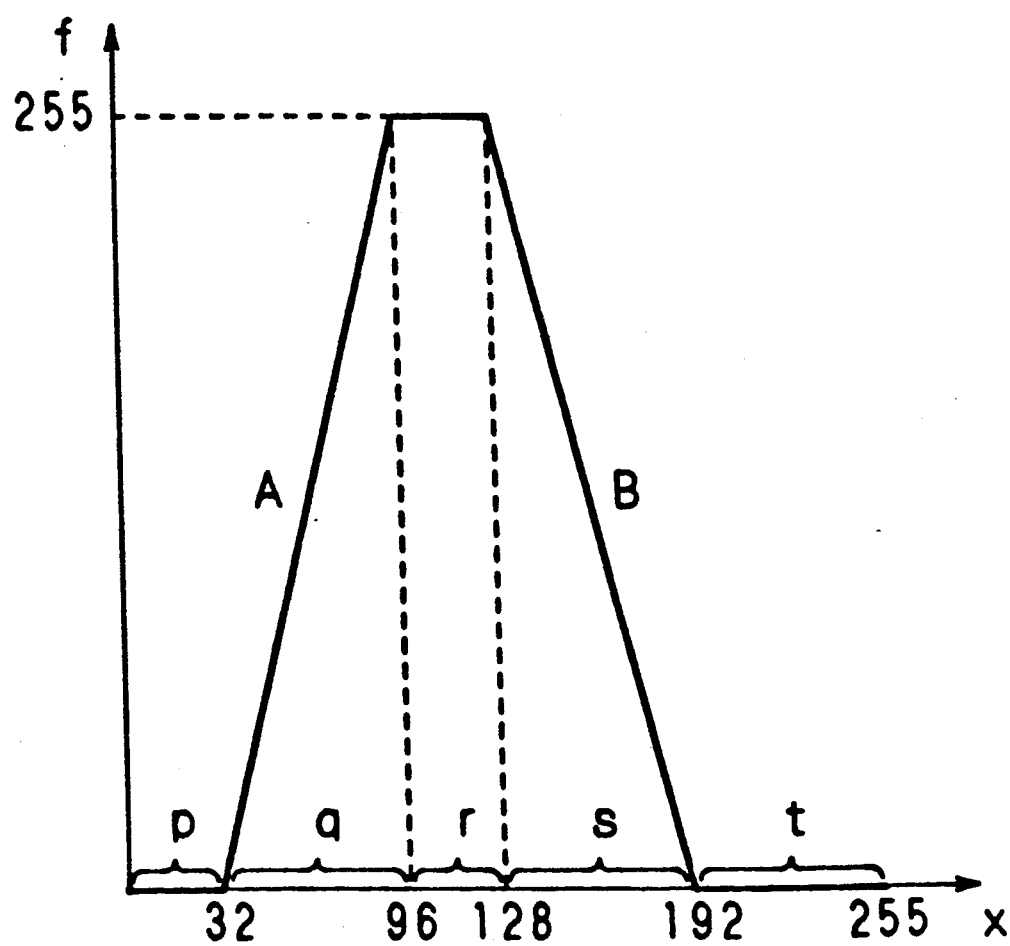
FIG. 2 is a view to explain a membership function.

To the operating unit 2, the input data 10 is inputted to the a$_0$ through a$_7$ and the control signal 11 is inputted to the b$_0$ through b$_7$, m$_0$ and m$_1$, and then, when the value "32" is designated by the signal values of b$_0$ through b$_7$ of the control signal 11 of ten bits and the value "2" is designated by the signal values to be inputted to the m$_0$ and m$_1$, respectively, the operating unit 2 executes such an operation as $$(x-32) \times 4$$

to generate the function, that is, the straight line A in FIG. 2. In the above operation, the x designates the value of the input data 10.

The operation results 13 of the operating unit 2 are outputted as f$_0$ through f$_7$ and are inputted to the input g$_0$ through g$_7$ of the data selector 4.

As in the same way as the operating unit 2, to the operating unit 3, the input data 10 is inputted to the b$_0$ through b$_7$ and the control signal 11 is inputted to a$_0$ through a$_7$, m$_0$ and m$_1$, respectively, and then, when the value "192" is designated by the signal values of a$_0$ through a$_7$ of the control signal 11 of ten bits and the value "2" is designated by the signal values to be inputted to m$_0$ and m$_1$, respectively, the operating unit 3 executes such an operation as $$(192-x) \times 4$$

to generate the function, that is, the straight line B in FIG. 2.

The operation results 14 of the operating unit 3 are outputted as f$_0$ through f$_7$ and are inputted to the input h$_0$ through h$_7$ of the data selector 4.

The d$_0$ and d$_1$ being the outputs 15 and 16 of operating unit 2 are inputted to the input m$_0$ and n$_0$ of the data selector 4 and the d$_0$ and d$_1$ being the outputs 17 and 18 of operating unit 3 are inputted to the input m$_1$ and n$_1$ of the data selector 4, respectively, and these values have such a relationship with the area of the value x shown in FIG. 2 as shown in a table of FIG. 7.

In the data selector 4, each of the comparison results 15, 16, 17 and 18 (which are two pairs of the d$_0$ and d$_1$) is inputted to each of m$_0$, m$_1$ n$_0$ and n$_1$ and each of the operation results 13 (straight line A) and 14 (straight line B) is inputted to each of g$_0$ through g$_7$ and h$_0$ through h$_7$. As a result, assuming that the output y$_0$ through y$_7$ of the data selector 4 are to be y, such a value as shown in the table of FIG. 7 is to be outputted. In other words, the operating units in FIG. 5 generate a membership function of such a trapezoid as shown in FIG. 2.

Figure 8:
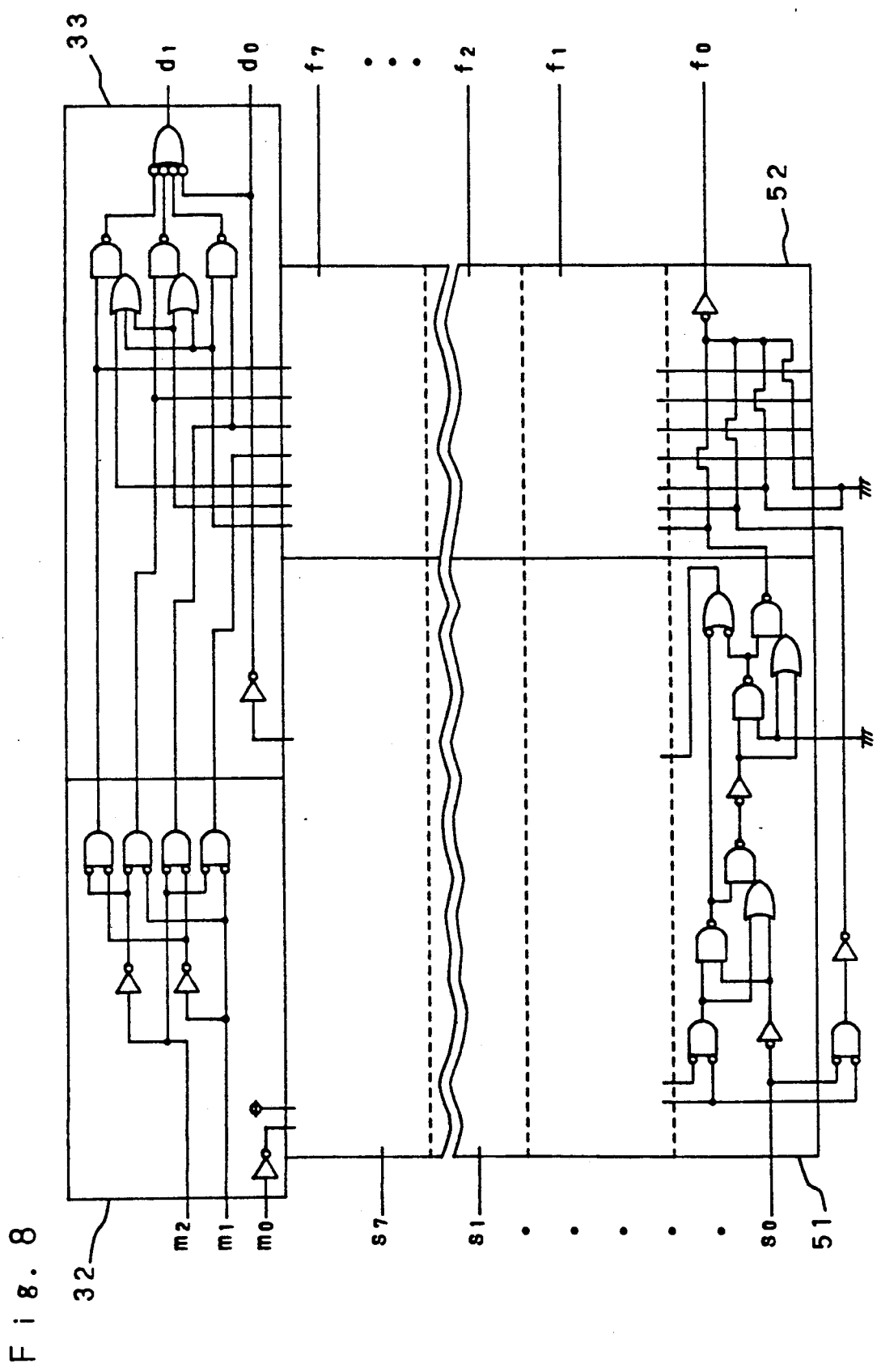
FIG. 8 is a circuit diagram to illustrate an example of another construction of a constant multiplying circuit of the fuzzy computer of the present invention.

In the above embodiment, there is shown the arrangement that a portion to multiply the subtraction results by the constant is the shifter 31 in the operating units 2 and 3, however, another arrangement, such as that shown in the circuit diagram of FIG. 8, may be adopted.

The operation results s$_0$ through s$_7$ (negative logic) obtain from a subtraction circuit such as that shown in FIG. 5 are inputted to s$_0$ through s$_7$ in FIG. 8. After that, the operation results are multiplied by the constant by the shifter alone in FIG. 5, while the operation results are multiplied by the constant by both of an adder and a shifter shown in the circuit diagram of FIG. 8.

In FIG. 8, reference numeral 51 designates the adder and reference numeral 52 designates the shifter (one bit of both of which is shown in the same way as in FIG. 5).

The adder 51 adds the operation results s$_0$ through s$_7$ (hereinafter referred to as s) to the value one bit shifted to the right side of the operation results. At that time, the value one bit shifted to the right side of the operation results is the intersection with m$_0$, accordingly, when m$_0$ is the value "1", the adder 51 outputs the value which multiplies the value of s by 1.5, and when m$_0$ is the value "0", the adder 51 outputs the operation results s just as it is. And the shifter 52 multiplies this output by 1, 2, 4 or 8. As a result, there can be obtained the value which was made by multiplying the operation results s by 1, 2, 4, 8 or 1.5, 3, 6, 12 as the output f according to the content of m$_0$ and m$_2$. In FIG. 8, reference numerals 32 and 33 designate a decoder and an overflow detection circuit, respectively, as in the same way in FIG. 5, functions of each of which being the same in those in FIG. 5.

Figure 9A:
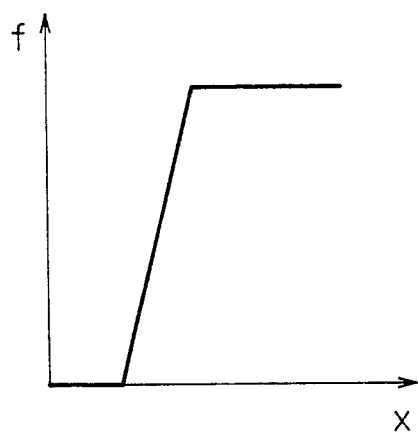
FIGS. 9(a) and 9(b) are views to explain a membership function.
Figure 9B:
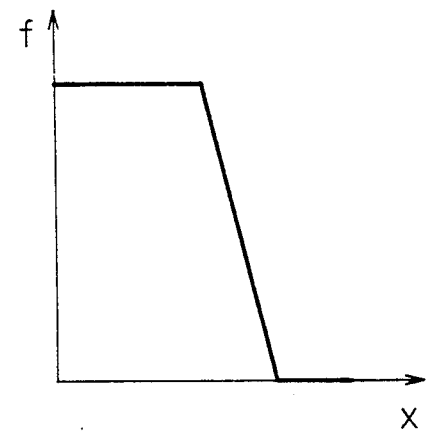

In the above embodiment, there has been described on the case where both of the control signals 19 and 20 which are outputted from the control part 5 to be the inputs c$_1$ and c$_0$ of data selector 4 are "0", however, another arrangement may be adopted that either of the control signals 19 or 20 is made to be "1" in order to forcibly make either the comparison results 18 of the operating unit 3 or the comparison results 16 of the operating unit 2 the value "1". In this case, a function of such a form as shown in FIG. 9(a) or FIG. 9(b) is to be obtained.

As may be seen from the above description, the portion to generate the membership function of the fuzzy computer of the present invention is capable of being adapted to comprise two operation units and a data selector for comparing the operation results of these operation units with predetermined values selecting either the operation results or the predetermined value according to the comparison results. As a result, there can be obtained the fuzzy computer with the portion to generate the membership function which needs to provide neither a large-storage memory for storing function values nor software process but can perform processing at higher speed with a small-storage hardware.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A digital device for computing a fuzzy membership function comprising:
   a first operation unit coupled to receive an input variable and a first control signal having:
   (i) a first subtractor having a minuend input coupled to said input variable and a subtrahend input coupled to said first control signal and wherein said first subtractor outputs a first difference signal;

(ii) a first comparator, coupled to receive said first difference signal for asserting a first overflow signal when said first difference signal exceeds a maximum value and for deasserting a second overflow signal when said first difference signal exceeds a minimum value;

a second operation unit coupled to receive said input variable and a second control signal having:

(i) a second subtractor having a minuend input coupled to said second control signal and a subtrahend input coupled to said input variable wherein said subtractor outputs a second difference signal;

(ii) a second comparator, coupled to receive said second difference signal for asserting a third overflow signal when said second difference signal exceeds said maximum value and for deasserting a fourth overflow signal when said second difference signal exceeds said minimum value; and a data selector coupled to receive said first difference signal, said second difference signal, said first, said second, said third and said fourth overflow signals for outputting:

(i) said maximum value when said first and said third overflow signals are asserted and said second and fourth overflow signals are deasserted;

(ii) said minimum value when said first and said fourth overflow signals are asserted and said second and third overflow signals are deasserted;

(iii) said minimum value when said second and said third overflow signals are asserted and said first and said fourth overflow signals are deasserted;

(iv) said first difference signal when said third overflow signal is asserted and said first, said second and said fourth overflow signals are deasserted; and (v) said second difference signal when said first overflow signal is asserted and said second, said third and said fourth overflow signals are deasserted.

2. The digital device of claim 1 further comprising a control part coupled to said first and second operating units for outputting said first and said second control signals.

3. The digital device of claim 1 wherein said data selector is further coupled to receive a third control signal; and wherein when said third control signal is asserted said first overflow signal is asserted.

4. The digital device of claim 1 wherein said data selector is further coupled to receive a third control signal; and wherein when said third control signal is asserted said third overflow signal is asserted.

5. The digital device of claim 1 wherein said first operation unit further comprises an adder disposed between said first subtractor and said first comparator for incrementing said first difference signal.

6. The digital device of claim 1 wherein said second operation unit further comprises an adder disposed between said second subtractor and said second comparator for incrementing said second difference signal.

7. A digital device for computing a fuzzy membership function comprising:

a first operation unit coupled to receive an input variable and a first control signal having:

(i) a first subtractor having a minuend input coupled to said input variable and a subtrahend input coupled to said first control signal and wherein said first subtractor outputs a first difference signal;

(ii) a first shifter coupled to receive said first difference signal wherein said first shifter outputs a first shifted difference signal;

(iii) a first comparator, coupled to receive said first shifted difference signal for asserting a first overflow signal when said first shifted difference signal exceeds a maximum value and for deasserting a second overflow signal when said first shifted difference signal exceeds a minimum value;

a second operation unit coupled to receive said input variable and a second control signal having:

(i) a second subtractor having a minuend input coupled to said second control signal and a subtrahend input coupled to said input variable wherein said subtractor outputs a second difference signal;

(ii) a second shifter coupled to receive said second difference signal wherein said second shifter outputs a second shifted difference signal;

(iii) a second comparator, coupled to receive said second shifted difference signal for asserting a third overflow signal when said second shifted difference signal exceeds said maximum value and for deasserting a fourth overflow signal when said second shifted difference signal exceeds said minimum value; and a data selector coupled to receive said first shifted difference signal, said second shifted difference signal, said first, said second, said third and said fourth overflow signals for outputting:

(i) said maximum value when said first and said third overflow signals are asserted and said second and fourth overflow signals are deasserted;

(ii) said minimum value when said first and said fourth overflow signals are asserted and said second and third overflow signals are deasserted;

(iii) said minimum value when said second and said third overflow signals are asserted and said first and said fourth overflow signals are deasserted;

(iv) said first shifted difference signal when said third overflow signal is asserted and said first, said second and said fourth overflow signals are deasserted; and (v) said second shifted difference signal when said first overflow signal is asserted and said second, said third and said fourth overflow signals are deasserted.

8. The digital device of claim 7 further comprising a control part coupled to said first and second operating units for outputting said first and said second control signals.

9. The digital device of claim 8 wherein said second operation unit further comprises:

an adder disposed between said first subtractor and said first shifter and coupled to receive said second difference signal for incrementing said second difference signal.

10. The digital device of claim 7 wherein said first operation unit further comprises a decoder, having an output coupled to said first shifter and having an input coupled to receive a shift control signal.

11. The digital device of claim 10, further comprising a control part coupled to said second operation unit wherein said control part outputs a shift control signal.

12. The digital device of claim 7 wherein said second operation unit further comprises a decoder, having an output coupled to said second shifter and having an input coupled to receive a shift control signal.

13. The digital device of claim 12, further comprising a control part coupled to said second operation unit wherein said control part outputs a shift control signal.

14. The digital device of claim 7 wherein said data selector is further coupled to receive a third control signal; and wherein when said third control signal is asserted said first overflow signal is asserted.

15. The digital device of claim 7 wherein said data selector is further coupled to receive a third control signal; and wherein when said third control signal is asserted said third overflow signal is asserted.

16. The digital device of claim 7 wherein said first operation unit further comprises:
 an adder disposed between said first subtractor and said first shifter and coupled to receive said first difference signal for incrementing said first difference signal.

17. A digital device for computing a fuzzy membership function having trapezoidal shape, wherein the trapezoidal shape is defined by a top and a bottom bases and two oblique sides comprising:
 a first operating unit, having a minuend input coupled to receive an input variable and a subtrahend input coupled to receive a first control signal, for outputting a first straight line function corresponding to said first oblique side;
 a second operating unit, having a minuend input coupled to receive a second control signal and a subtrahend input coupled to receive said input variable, for outputting a second straight line function corresponding to said second oblique side;
 a first comparator, coupled to said first operating unit, for asserting a first overflow signal when a value of said first straight line function exceeds a top base value, and for deasserting a second overflow signal when said value of said first straight line function exceeds a bottom base value;
 a second comparator, coupled to said second operating unit, for asserting a third overflow signal when a value of said second straight line function exceeds said top base value and for deasserting a fourth overflow signal when said value of said second straight line function exceeds said bottom base value; and
 a selector circuit coupled to said first and said second operating units and to said first and second comparators for outputting:
  (i) said top base value when said first and said third overflow signals are asserted and said second and fourth overflow signals are deasserted;
  (ii) said bottom base value when said first and said fourth overflow signals are asserted and said second and third overflow signals are deasserted;
  (iii) said bottom base value when said second and said third overflow signals are asserted and said first and said fourth overflow signals are deasserted;
  (iv) said first straight line function when said third overflow signal is asserted and said first, said second and said fourth overflow signals are deasserted; and
  (v) said second straight line function when said first overflow signal is asserted and said second, said third and said fourth overflow signals are deasserted.

18. The digital device of claim 17 wherein said first operating unit further comprises a shifter.

19. The digital device of claim 17 wherein said first operating unit comprises:
 a subtractor for subtracting said first control signal from said input variable;
 an adder having an input coupled to an output of said subtractor; and
 a shifter having an input coupled to an output of said adder.

20. The digital device of claim 17 wherein said second operating unit comprises:
 a subtractor for subtracting said input variable from said second control signal;
 an adder having an input coupled to an output of said subtractor; and
 a shifter having an input coupled to an output of said adder.

21. The digital device of claim 17 wherein said second operating unit further comprises a shifter.

22. The digital device of claim 17 further comprising a control part coupled to said first and said second operating units for outputting said first and said second control signals.

23. The digital device of claim 17 wherein said first operating unit further comprises an adder for incrementing said first straight line function.

24. The device of claim 17 wherein said second operating unit further comprises an adder for incrementing said second straight line function.

* * * * *